United States Patent [19]

Kubo

[11] 4,296,368
[45] Oct. 20, 1981

[54] INTERNAL COMBUSTION ENGINE DRIVEN GENERATOR

[75] Inventor: Masaaki Kubo, Sunto, Japan

[73] Assignee: Kokusan Denki Co., Ltd., Japan

[21] Appl. No.: 86,634

[22] Filed: Oct. 22, 1979

[30] Foreign Application Priority Data

Oct. 26, 1978 [JP] Japan ............... 53-147388[U]

[51] Int. Cl.³ .................................. H02P 9/10
[52] U.S. Cl. .......................... 322/75; 322/95; 322/89
[58] Field of Search .................. 322/89, 95–98, 322/75–78, 100

[56] References Cited

U.S. PATENT DOCUMENTS

| 1,104,257 | 7/1914 | Goldschmidt | 322/96 |
| 2,349,308 | 5/1944 | Rhyne | 322/98 X |
| 3,121,838 | 2/1964 | Mozic | 322/96 X |
| 3,697,859 | 10/1972 | Nordbrock | 322/75 X |

FOREIGN PATENT DOCUMENTS 33-236758 1/1958 Japan .

Primary Examiner—Robert J. Hickey
Attorney, Agent, or Firm—Pearne, Gordon, Sessions, McCoy & Granger

[57] ABSTRACT

In an internal combustion engine driven generator in which a capacitor excitation type synchronous generator is driven by an internal combustion engine, the internal combustion engine has a characteristic that the revolution per minute thereof is increased with a decreasing load applied thereto, and the generator has a characteristic that the output voltage thereof is decreased with a decreasing load current with the revolution per minute maintained unchanged.

10 Claims, 6 Drawing Figures

INTERNAL COMBUSTION ENGINE DRIVEN GENERATOR

BACKGROUND OF THE INVENTION

This invention relates to an internal combustion engine driven generator in which a capacitor excitation type synchronous generator is driven by an internal combustion engine.

In an internal combustion engine employed for a generator of this type, control is so made that the internal combustion engine provides its rated output when the revolution per minute (rpm) of the generator is its rated one and that the revolution per minute of the engine is maintained as constant as possible by the governor when a load applied thereto is relatively light. However, practically, the revolution per minute is increased by 4 to 10% with no load. Accordingly, heretofore it is necessary to provide an automatic voltage regulator for the generator to suppress the increase of the output voltage attributed to the increase of speed which is caused when the load is relatively light. Thus, the method is disadvantageous in that the device is necessarily intricate in construction and accordingly high in manufacturing cost.

SUMMARY OF THE INVENTION

Accordingly, an object of this invention is to eliminate all of the above-described difficulties accompanying a conventional internal combustion engine driven generator. More specifically, an object of the invention is to provide an internal combustion engine driven generator in which the provision of an automatic voltage regulation is unnecessary and the output voltage thereof is maintained substantially constant.

The foregoing object and other objects as well as the characteristic features of the present invention will become more apparent from the following detailed description and the appended claims when read in conjunction with the accompanying drawings.

DETAILED DESCRIPTION OF THE INVENTION

Figure 1:
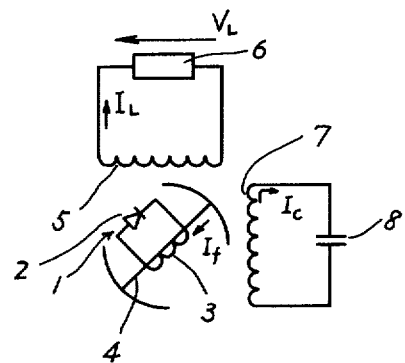
FIG. 1 is an electrical circuit diagram showing one example of a capacitor excitation type synchronous generator employed in this invention.

A capacitor excitation type synchronous generator employed in this invention, as shown in FIG. 1, comprises: a rotor 1 in which a diode 2 is connected between both ends of a field winding 3 wound around an iron core 4, the rotary axis of the rotor 1 coupled to the output shaft of an internal combustion engine (not shown); an output winding 5 to which a load 6 is connected; a capacitor excitation winding 7 between the two ends of which a capacitor 8 is connected, the output winding 5 and the capacitor excitation winding 7 being wound on a common iron core.

In this generator, a voltage is induced in the capacitor excitation winding 7 by the residual magnetism of the field core (or the rotor core), and the voltage allows a leading phase current Ic to flow in the capacitor excitation winding 7. A self-excitation phenomenon is caused by the magnetism increasing action of the leading phase current, and at the same time a field current If is caused to flow from the field winding 3 through the diode 2 by an opposite phase electromotive force which is provided in the field winding 3 by the armature reaction of the capacitor excitation winding 7. Accordingly, the field core is further excited, so that the voltages of the output winding 5 and the capacitor excitation winding 7 are established.

Figure 2:
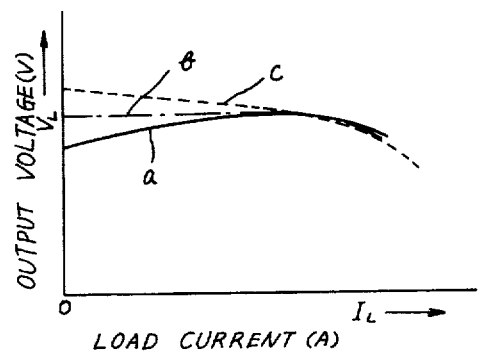
FIG. 2 is a graphical representation indicating the output voltage vs. load current characteristic curves of the generator shown in FIG. 1, with the ampereturns of the capacitor excitation circuit as parameters.

With this generator, output voltage ($V_L$) vs. load current ($I_L$) characteristic curves as indicated by a, b and c in FIG. 2 can be obtained by controlling the product of the number of turns (Wc) of the capacitor excitation winding 7 and the current Ic of the capacitor excitation circuit, i.e., the ampere-turns Wc.Ic.

In FIG. 2, the ampere-turns in the case of the curve a is smaller than that in the case of the curve b, which is smaller than that in the case of the curve c. The ampere-turns $W_c.I_c$ can be suitably determined by changing the number of turns of the capacitor excitation winding 7 or the capacitance of the capacitor 8.

Figure 3:
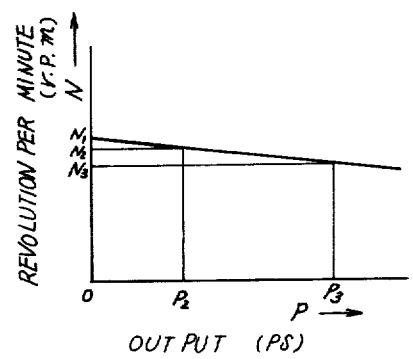
FIG. 3 is a graphical representation indicating the revolution per minute vs. output characteristic curve of an internal combustion engine.

On the other hand, the revolutions per minute N vs. output P (ps) characteristic of an internal combustion engine with a governor is as indicated in FIG. 3. Accordingly, even in the case where the variation of revolutions per minute with respect to the output is suppressed by the governor as much as possible, the revolutions per minute increase with a decreasing load.

It has been found from the characteristics shown in FIGS. 2 and 3, according to one aspect of the invention, that if the ampere-turns $W_c.I_c$ are so determined that the output voltage $V_L$ decreases with the decrease of the load current $I_L$ with the revolutions per minute (rpm) maintained unchanged as indicated by the curve a in FIG. 2, the output voltage $V_L$ can be maintained constant without using an automatic voltage regulator.

Figure 4:
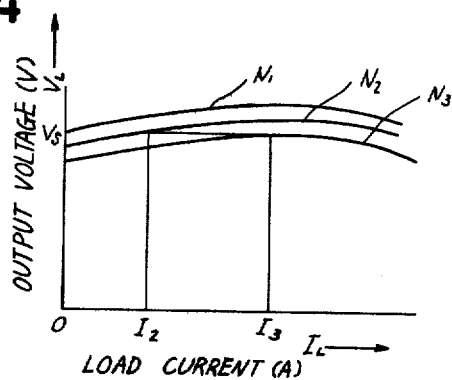
FIG. 4 is also a graphical representation indicating the output voltage vs. load current characteristic curves of the generator in FIG. 1, with the revolution per minutes as parameters.

With the revolutions per minute $N_1$, $N_2$ and $N_3$ ($N_1 > N_2 > N_3$) of the generator as parameters, the characteristic curve a in FIG. 2 is as indicated in FIG. 4. That is, with the load current maintained unchanged, the output voltage is increased as the revolutions per minute increase. If, when the rated revolutions per minute of the generator is $N_3$, the control is so made that the revolutions per minute is $N_3$ with the rated output $P_3$ of the engine, then when the rated load current $I_3$ flows in the generator the revolutions per minute becomes $N_3$, and in this case the output voltage is Vs as shown in FIG. 4. When the load is decreased and the load current is decreased to $I_2$ ($< I_3$), the load of the engine is decreased to $P_2$, and therefore the revolutions per minute are increased to $N_2$. When the revolutions per minute are increased to $N_2$, the output voltage vs. load current characteristic curve is shifted upwardly as a whole as shown in FIG. 4. Accordingly, even if the load current is decreased to $I_2$, the output voltage is maintained substantially at Vs. When the load current is decreased to zero, the revolutions per minute of the engine are increased to $N_1$. However, in this case also, the output voltage vs. load current characteristic curve is further shifted upwardly as a whole, and therefore the output voltage is maintained substantially at Vs.

Figure 5:
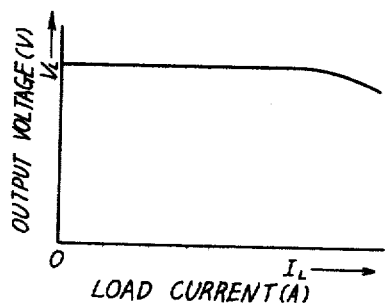
FIG. 5 is a graphical representation indicating an output voltage vs. load current characteristic curve of an internal combustion engine driven generator according to this invention.

The ideal case has been described. However, when a capacitor excitation type generator having a characteristic as indicated by the characteristic curve a in FIG. 2 is combined with an internal combustion engine having a characteristic as indicated in FIG. 3, the actual output voltage vs. load current characteristic is as shown in FIG. 5. Thus, the output voltage can be maintained substantially constant over a wide range of load current.

Figure 6:
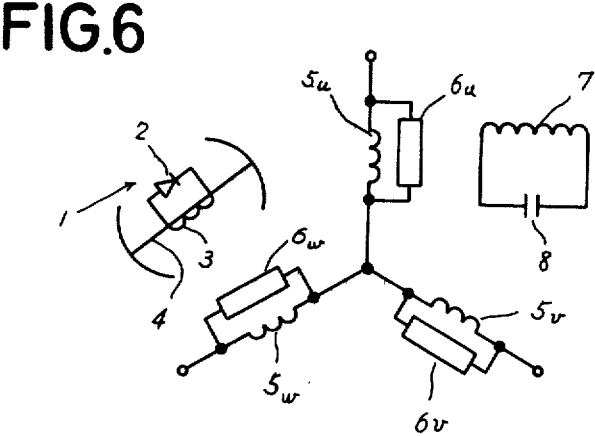
FIG. 6 is an electrical circuit diagram showing another example of the capacitor excitation type synchronous generator employed in the invention.

The invention has been described with respect to the capacitor excitation type single-phase generator. However, it should be noted that the technical concept of the invention is applicable to a capacitor excitation type three-phase generator in which, as shown in FIG. 6, load $6u$, $6v$ and $6w$ are provided for the output windings $5u$, $5v$ and $5w$, respectively.

As is apparent from the above description, according to the invention, though the capacitor excitation type generator has a characteristic that, with the revolutions per minute thereof maintained unchanged, the output voltage of the generator is decreased as the load current decreases, the variations of the output voltage can be substantially eliminated without using a voltage regulator. Therefore, the variations of the output voltage can be substantially eliminated without using a voltage regulator. Accordingly, the construction of the generator can be simplified, and the reliability is improved. Furthermore, the manufacturing cost can be reduced.

What is claimed is:

1. An internal combustion engine driven generator in which a capacitor excitation type synchronous generator is driven by an internal combustion engine and has a parallel circuit of capacitor excitation winding means and capacitor means, said capacitor excitation winding means and said capacitor means providing sufficiently small ampere-turns of excitation so that, with a constant speed, the output voltage of the generator is decreased as the load current thereof decreases.

2. A generator as claimed in claim 1, in which the stator of said capacitor excitation type synchronous generator is provided with output winding means and said parallel circuit of capacitor excitation winding means and capacitor means, and the rotor of said capacitor excitation type synchronous generator is provided with a parallel circuit of field winding means and rectifier means.

3. A generator as claimed in claim 2, in which said output winding means is a single phase output winding.

4. A generator as claimed in claim 2, in which said output winding means is of three phase output windings.

5. A generator as claimed in claim 1, in which said internal combustion engine has a characteristic that the revolutions per minute thereof are increased as a load applied thereto decreases.

6. An internal combustion engine driven generator in which a capacitor excitation type synchronous generator is driven by an internal combustion engine, said generator comprising a stator having output winding means and capacitor excitation winding means, capacitor means connected across said capacitor excitation winding means, a rotor having a field winding means, and rectifier means connected across said field winding means;

wherein said generator has a characteristic that, with the revolutions per minute thereof maintained unchanged, the output voltage of said generator is decreased as the load current thereof decreases.

7. A generator as claimed in claim 6, in which said output winding means is a single phase output winding.

8. A generator as claimed in claim 6, in which said output winding means is a three phase output winding.

9. A generator as claimed in claim 6, in which said internal combustion engine has a characteristic that the revolutions per minute thereof are increased as the load applied thereto decreases.

10. A generator as claimed in claim 6, 7, 8, or 9, in which said capacitor excitation type synchronous generator has a characteristic that, with the revolutions per minute thereof maintained unchanged, the output voltage thereof is decreased with the decreasing load current by suitably selecting the ampere-turns of said capacitor excitation winding means and capacitor means.

* * * * *